US012344011B2

(12) United States Patent
Robinson et al.

(10) Patent No.: US 12,344,011 B2
(45) Date of Patent: Jul. 1, 2025

(54) SUPPORT ASSEMBLY FOR HEAT TRANSFER PRINTER AND CUTTER

(71) Applicant: Stahls' Inc., St. Clair Shores, MI (US)

(72) Inventors: Benjamin B. Robinson, Smithfield, PA (US); Weiyu Zhang, Pittsburgh, PA (US); Hamza Oussous, Morgantown, WV (US)

(73) Assignee: Stahls' Inc., St. Clair Shores, MI (US)

( * ) Notice: Subject to any disclaimer, the term of this patent is extended or adjusted under 35 U.S.C. 154(b) by 0 days.

(21) Appl. No.: 18/085,669

(22) Filed: Dec. 21, 2022

(65) Prior Publication Data

US 2024/0208256 A1 Jun. 27, 2024

(51) Int. Cl.
| | | |
|---|---|---|
| B41J 29/06 | (2006.01) | |
| F16M 11/38 | (2006.01) | |
| B41J 13/02 | (2006.01) | |
| B62B 3/02 | (2006.01) | |
| B66F 7/28 | (2006.01) | |
| F16M 11/20 | (2006.01) | |
| F16M 11/42 | (2006.01) | |

(52) U.S. Cl.
CPC .............. *B41J 29/06* (2013.01); *F16M 11/38* (2013.01); *B41J 13/02* (2013.01); *B62B 3/02* (2013.01); *B66F 7/28* (2013.01); *F16M 11/2092* (2013.01); *F16M 11/42* (2013.01)

(58) Field of Classification Search
CPC ......... B41J 29/06; B41J 15/042; F16M 11/38; F16M 11/42; F16M 11/2092; B66F 7/28; B62B 3/022; B62B 3/02
See application file for complete search history.

(56) References Cited

U.S. PATENT DOCUMENTS

| | | | | | |
|---|---|---|---|---|---|
| 1,707,769 | A | * | 4/1929 | Rastetter ................... | A47C 4/14 |
| | | | | | 297/57 |
| 1,895,115 | A | * | 1/1933 | Williams ................ | A47C 4/283 |
| | | | | | 297/36 |
| 2,278,568 | A | * | 4/1942 | Segre ........................ | A47C 4/32 |
| | | | | | 248/436 |
| 5,683,135 | A | * | 11/1997 | Williams .................. | A47B 3/14 |
| | | | | | 108/118 |

(Continued)

FOREIGN PATENT DOCUMENTS

| | | | | |
|---|---|---|---|---|
| CN | 104635460 | B | | 5/2015 |
| CN | 108099980 | A * | 6/2018 | ............... B62B 3/02 |

(Continued)

OTHER PUBLICATIONS

International Search Report, PCT/US2023/085405, dated May 29, 2024.

*Primary Examiner* — Tan Le
(74) *Attorney, Agent, or Firm* — Fishman Stewart PLLC

(57) ABSTRACT

A support assembly for a heat transfer printer and cutter may include a first leg, a second leg pivotably connected to the first leg, a first support member pivotably connected to the first leg, and a second support member pivotably connected to the second leg. The first support member and the second support member may be releasably connectable. The support assembly may be adjustable to a use position and to a storage position via rotating the first leg and the second leg relative to one another, rotating the first support member relative to the first leg, and rotating the second support member relative to the second leg.

18 Claims, 12 Drawing Sheets

(56) References Cited

U.S. PATENT DOCUMENTS

| | | | |
|---|---|---|---|
| 5,709,481 A | | 1/1998 | Hinojosa |
| 9,604,468 B2 | | 3/2017 | Benton |
| 9,636,904 B2 | | 5/2017 | Sano |
| 2015/0125193 A1 | | 5/2015 | Ishii |
| 2017/0080722 A1 | | 3/2017 | Yada |
| 2019/0302655 A1 | | 10/2019 | Landa |
| 2021/0268814 A1 | | 9/2021 | Kitagawa |
| 2021/0316440 A1 | * | 10/2021 | Peterson ............ F16M 11/2092 |

FOREIGN PATENT DOCUMENTS

| | | | | | |
|---|---|---|---|---|---|
| CN | 209411723 U | * | 9/2019 | | |
| EP | 758576 A1 | * | 2/1997 | ............... | A47B 3/02 |
| FR | 2793394 A1 | * | 11/2000 | ............... | A47B 3/02 |
| JP | H07330194 A | | 12/1995 | | |
| JP | 7056962 B2 | | 4/2022 | | |
| WO | WO-2014180572 A1 | * | 11/2014 | ........... | B62B 5/0003 |
| WO | 2017058141 A1 | | 4/2017 | | |

\* cited by examiner

SUPPORT ASSEMBLY FOR HEAT TRANSFER PRINTER AND CUTTER

TECHNICAL FIELD

The exemplary illustrations described herein are generally directed to support assemblies, such as support assemblies for heat transfer printers and cutters.

BACKGROUND

Lettering, logos, and designs applied to substrates such as fabrics and hard surfaces are often made as heat applied transfers. Heat transfer lettering and designs are often formed from a multi-layer feed material. One layer is generally a carrier, which may comprise a sheet of plastic material that is typically sticky or tacky. Another layer (e.g., a design layer) is comprised of the material used for the letters and designs themselves (i.e., a design material, such as vinyl), and is often formed on the carrier. The lettering, logo, and/or design may be cut out from the multi-layer material, such as by the heat transfer printer and cutter.

Known heat transfer printers and cutters are typically relatively large and heavy, and thus operators typically will mount the heat transfer printer and cutter on large tables, stands, or support assemblies. Even as heat transfer printers and cutters have become smaller and, in some cases, more portable, known support assemblies for heat transfer printers and cutters remain large, heavy, difficult to adjust and/or move, and challenging to store. Moreover, some support assemblies may only be compatible with a single heat transfer printer and cutter or a small number of heat transfer printers and cutters.

Accordingly, there is a need for an improved support assembly for heat transfer printers and cutters.

SUMMARY

A support assembly for a heat transfer printer and cutter may include a first leg, a second leg, a first support member, and a second support member. The second leg may be pivotably connected to the first leg. The first support member may be pivotably connected to the first leg. The second support member may be pivotably connected to the second leg. The first support member and the second support member may be releasably connectable. The support assembly may be adjustable to a use position and to a storage position via rotating the first leg and the second leg relative to one another, rotating the first support member relative to the first leg, and rotating the second support member relative to the second leg.

A support assembly for a heat transfer printer and cutter may include a first leg, a second leg, a leg pin, a first support member, a second support member, a first support pin, a second support pin, a first mounting plate, and a second mounting plate. The second leg may include a stop. The leg pin may pivotably connect the first leg and the second leg. The first support pin may pivotably connect the first leg and the first support member. The second support pin may pivotably connect the second leg and the second support member. The first mounting plate may be disposed on the first support member. The second mounting plate may be disposed on the second support member. The support assembly may be adjustable to a storage position and to a use position. The support assembly may be adjustable from the storage position to the use position via sequentially (i) rotating the first leg and the second leg away from one another about the leg pin until the first leg is disposed on the stop, (ii) rotating the first support member away from the first leg about the first support pin and rotating the second support member away from the second leg about the second support pin, (iii) rotating the first leg and the second leg toward one another about the leg pin, and (iv) releasably connecting the first support member and the second support member.

A method of fabricating a support assembly for a heat transfer printer and cutter may include providing a first leg, a second leg, a first support member, and a second support member. The method may further include providing at least one of a lock mechanism and a safety pin via which the first support member and the second support member are releasably connectable. The method may also include pivotably connecting the first leg and the second leg, pivotably connecting the first leg and the first support member, and pivotably connecting the second leg and the second support member. The first leg and the second leg may be rotatable relative to one another, the first support member may be rotatable relative to the first leg, and the second support member may be rotatable relative to the second leg to adjust the support assembly to a use position and to a storage position.

BRIEF DESCRIPTION OF THE DRAWINGS

While the claims are not limited to the illustrated embodiments, an appreciation of various aspects is best gained through a discussion of various examples thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the disclosed subject matter described herein is not intended to be exhaustive or otherwise limiting or restricting to the precise form and configuration shown in the drawings and disclosed in the following detailed description. Examples of the present disclosed subject matter are described in detail by referring to the drawings as follows.

DETAILED DESCRIPTION

Figure 1:
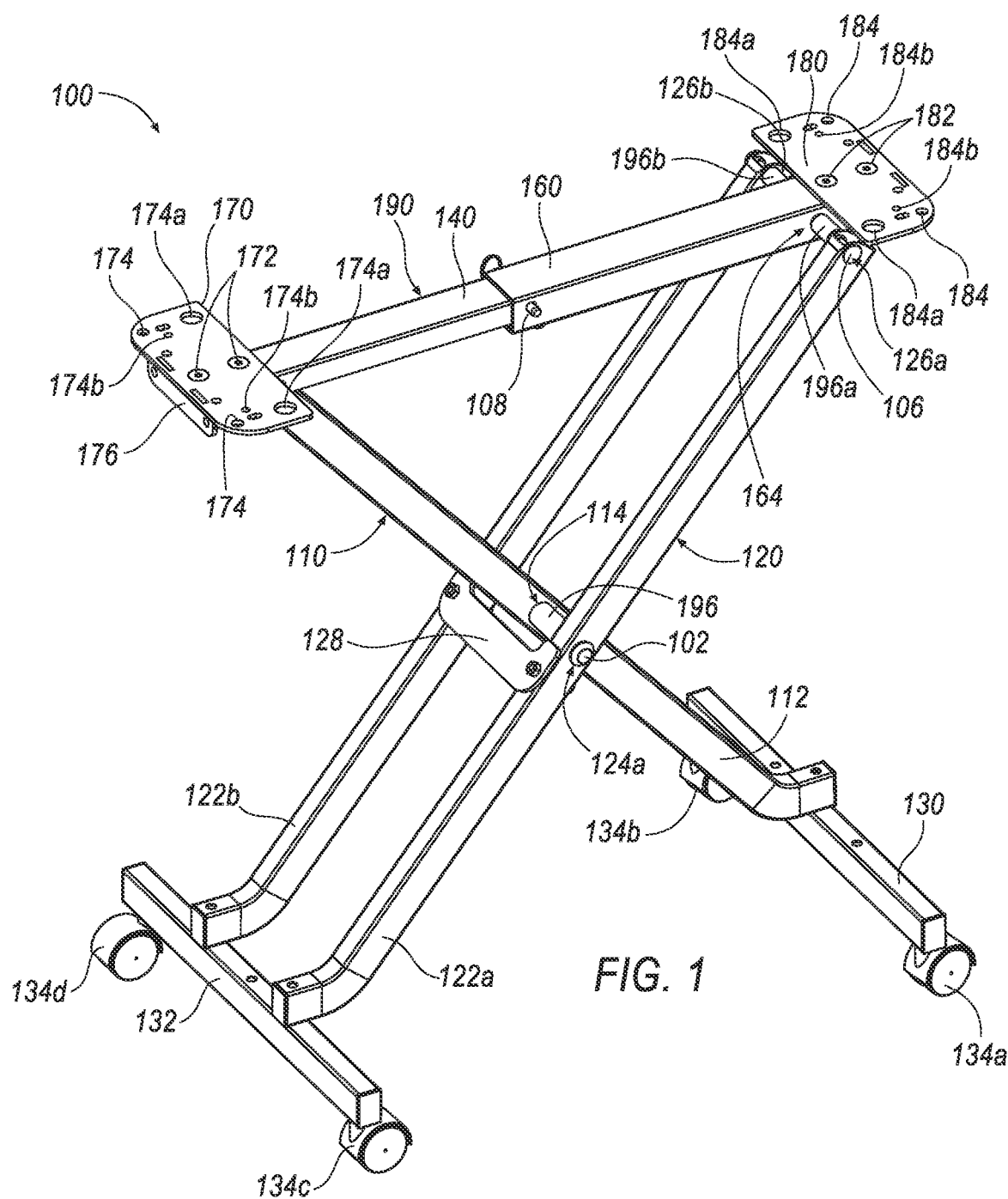
FIG. 1 is a perspective view of an exemplary support assembly.

Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limit or restrict the invention to the precise form and configuration shown in the drawings and disclosed in the following detailed description.

Referring now to FIGS. 1-8B, an exemplary support assembly 100 for a heat transfer printer and cutter 300 is shown. Optionally, the support assembly 100 may include a feed assembly 230 for supporting and/or retaining feed material 302 (e.g., a roll of feed material, such as a roll of multi-layer material that may include vinyl) as illustrated in FIGS. 6-8B. The support assembly 100 is adjustable to a storage position and a use position. An exemplary method of adjusting the support assembly 100 from the storage position to the use position and selectively locking the support assembly 100 in the use position is illustrated in FIGS. 4A-4E and 5A-5C. When the support assembly 100 is disposed in the storage position (see FIG. 4A), the support assembly 100 is more compact enabling it to be easily moved (e.g., around a shop floor) and stored. When the support assembly 100 is disposed in the use position (see FIGS. 1-3, 4D, 4E, 5C, 6, and 7), a heat transfer printer and cutter 300 is connectable to the support assembly 100 and the support assembly 100 is able to support the weight of the heat transfer printer and cutter 300 and the feed material 302 in a secure and stable manner. The support assembly 100 may be selectively locked in the use position by a safety pin 108 to prevent the support assembly 100 from being adjusted out of the use position (e.g., toward and/or to the storage position), which may reduce risk of injury and/or property damage. The safety pin 108 may also function as a second safety feature (in addition to the lock mechanism 200). Optionally, a size and/or a material of the safety pin 108 is selected to satisfy one or more stress and/or fatigue thresholds or standards. Therefore, the safety pin 108 size and material are selected to meet desired stress and fatigue thresholds, and works as a second safety feature in addition to the lock mechanism 200.

Referring now to FIG. 1, the support assembly 100 includes a first leg 110, a second leg 120, a first support member 140, and a second support member 160. The first leg 110 and the second leg 120 extend in substantially parallel planes and are pivotably connected to one another via a leg pin 102, which defines a first pivot axis 102a. The first support member 140 is pivotably connected to the first leg 110 via a first support pin 104, which defines a second pivot axis 104a. The second support member 160 is pivotably connected to the second leg 120 via a second support pin 106, which defines a third pivot axis 106a. The first support member 140 and the second support member 160 are releasably connectable by a lock mechanism 200 and/or a safety pin 108 to form a cross member 190, which connects the first leg 110 and the second leg 120 to one another. The cross member 190 restricts and/or effectively prevents rotation of the first leg 110 and the second leg 120 about the leg pin 102, rotation of the first leg 110 and the first support member 140 about the first support pin 104, and rotation of the second leg 120 and the second support member 160 about the second support pin 106. The leg pin 102, the support pins 104, 106, and the safety pin 108 extend substantially parallel to one another. The first, second, and third pivot axes 102a. 104a, 106a extend substantially parallel to one another and to the safety pin 108.

The first leg 110 includes a first leg member 112, a leg pin recess 114, a support pin recess 116, a first foot 130, and a plurality of first wheels 134a, 134b. The first leg 110 has an upper end, a lower end, and an intermediate region disposed therebetween.

The first leg member 112 is structured as an elongated member, such as a hollow tube or solid bar. The first leg member 112 has a first longitudinal end (e.g., an upper end), a second longitudinal end (e.g., a lower end), and an intermediate region disposed therebetween. The intermediate region of the first leg 110 and/or the first leg member 112 is pivotably connected to the second leg 120 via the leg pin 102. The upper end of the first leg 110 and/or the first leg member 112 is pivotably connected to the first support member 140 via the first support pin 104. The lower end of the first leg member 112 is connected (e.g., fixed) to the first foot 130.

The first leg member 112 includes the leg pin recess 114 and the support pin recess 116. The leg pin recess 114 is disposed in the intermediate region of the first leg 110 and/or the first leg member 112 and receives the leg pin 102. The support pin recess 116 is disposed adjacent to the upper end of the first leg 110 and/or the first leg member 112 and receives the first support pin 104.

The second leg 120 includes a second leg member 122a, a third leg member 122b, a plurality of leg pin recesses 124a, 124b, a plurality of support pin recesses 126a, 126b, a stop 128, a second foot 132, and a plurality of second wheels 162a, 162b. The second leg 120 has a first longitudinal end (e.g., an upper end), a second longitudinal end (e.g., a lower end), and an intermediate region disposed therebetween. In other embodiments, the second leg 120 only includes a single leg member and/or the first leg 110 includes the stop 128.

The second leg member 122a is structured as an elongated member, such as a hollow tube or solid bar. The second leg member 122a has a first longitudinal end (e.g., an upper end), a second longitudinal end (e.g., a lower end), and an intermediate region disposed therebetween. The intermediate region of the second leg 120 and/or the second leg member 122a is pivotably connected to the first leg 110 via the leg pin 102. The upper end of the second leg 120 and/or the second leg member 122a is pivotably connected to the second support member 160 via the second support pin 106. The lower end of the second leg member 122a is connected (e.g., fixed) to the second foot 132.

The second leg member 122a includes a leg pin recess 124a and a support pin recess 126a. The leg pin recess 124a is disposed in the intermediate region of the second leg 120 and/or the second leg member 122a and receives the leg pin 102. The support pin recess 126a is disposed adjacent to the upper end of the second leg 120 and/or the second leg member 122a and receives the second support pin 106.

The third leg member 122b includes a leg pin recess 124b and a support pin recess 126b. The third leg member 122b, leg pin recess 124b, and support pin recess 126b are structured and arranged like the second leg member 122a, leg pin recess 124a, and support pin recess 126a and, for brevity, are not described in detail. The third leg member 122b extends substantially parallel to the second leg member 122a and is disposed spaced apart from the second leg member 122a. The second and third leg members 122a, 122b are connected (e.g., fixed) to one another via the second foot 132 and the stop 128.

The first, second, and third leg members 112, 122a, 122b extend in substantially parallel planes. The first leg member 112 is disposed between the second and third leg members 122a, 122b such that the leg pin recesses 114, 124a, 124b are aligned with one another. The leg pin 102 is disposed in and extends through the leg pin recesses 114, 124a. 124b transversely (e.g., perpendicularly) to the first, second, and third leg members 112, 122a, 122b thereby pivotably connecting the first leg 110 and the second leg 120. The stop 128 extends between and connects the second leg member 122a and the third leg member 122b adjacent to the leg pin recesses 124a, 124b and/or the leg pin 102. The stop 128 restricts and/or prevents rotation of the legs 110, 120 about the leg pin 102 beyond a certain point (e.g., beyond the stopped position shown in FIGS. 4B and 4C) by contacting the first leg member 112, to prevent the assembly from falling down and upon itself during assembly.

Figure 6:
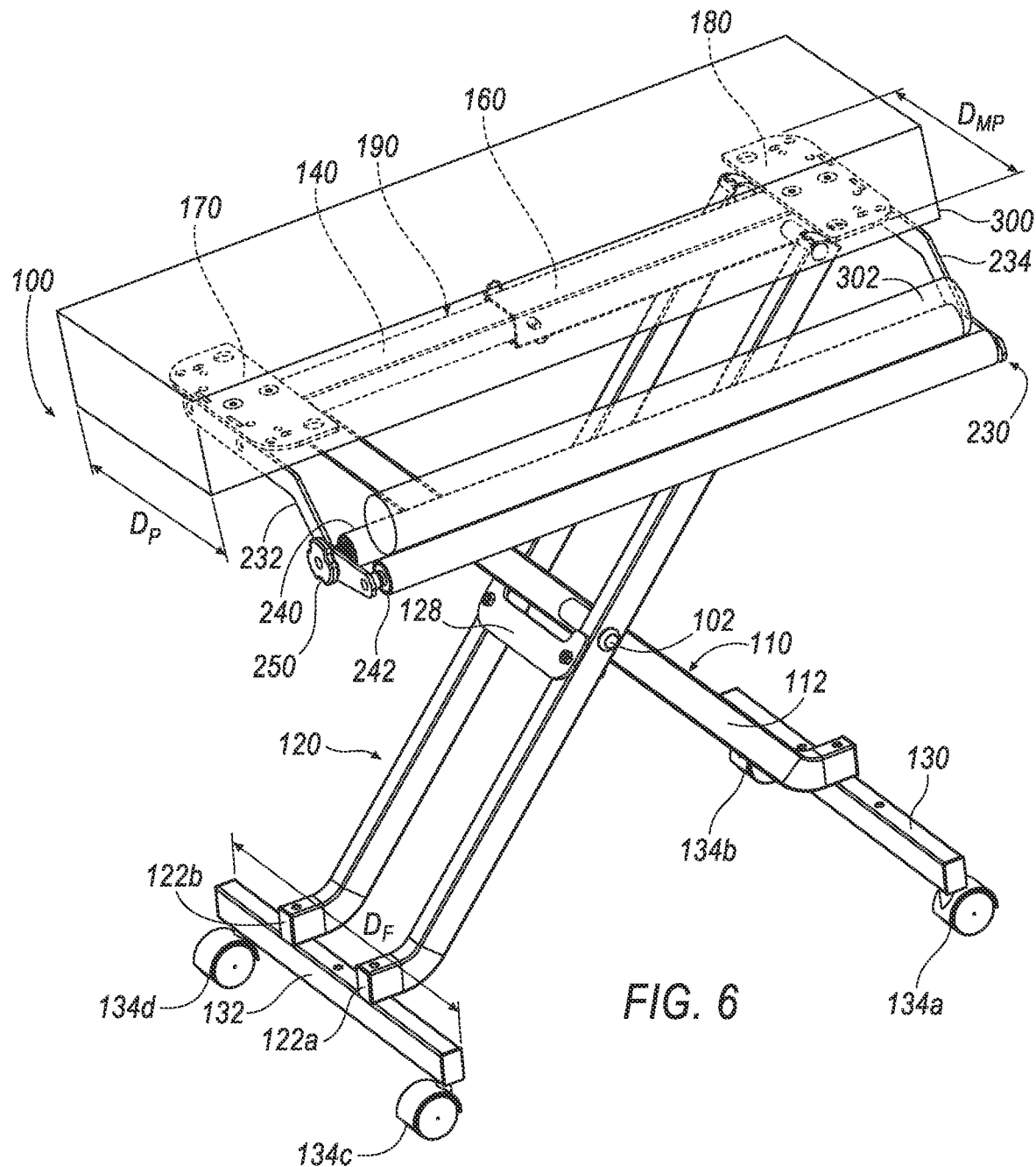
FIG. 6 is a perspective view of the support assembly shown in FIG. 1, with an exemplary feed assembly connected to the support members, an exemplary heat transfer printer and cutter (shown in phantom) disposed on and connected to the support assembly, and a roll of feed material (shown in phantom) disposed on the feed assembly.

The first foot 130 and the second foot 132 are each structured as an elongated member, such as a hollow tube or solid bar. The feet 130, 132 extend substantially transversely (e.g., perpendicularly) to the legs 110, 120, the leg members 112, 122a, 122b, and the support members 140, 160. The feet 130, 132 may also extend substantially parallel to the pins 102, 104, 106, 108. The first foot 130 is disposed at the lower end of the first leg 110 and is connected (e.g., fixed) to the lower end of the first support member 112. The second foot 132 is disposed at the lower end of the second leg 120 and is connected (e.g., fixed) to the lower end of the second and third leg members 122a, 122b. The first wheels 134a, 134b are connected to the first foot 130 and are disposed at opposite longitudinal ends of the first foot 130. The second wheels 134c, 134d are connected to the second foot 132 and are disposed at opposite longitudinal ends of the second foot 132. However, the wheels 134a-134d may be disposed on the first foot 130 and/or the second foot 132 at other suitable positions as desired. The wheels 134a-134d may be selectively lockable to restrict and/or prevent movement of the support assembly 100, such as when in the use position. As generally illustrated in FIG. 6, a length $D_F$ of the feet 130, 132 may be greater than a length $D_{MP}$ of the mounting plates 170, 180 and/or a length $D_P$ of most heat transfer printers and cutters 300, which may increase the stability of the support assembly 100 and/or reduce the likelihood of the support assembly 100 tipping over, particularly when the wheels 134a-134d are locked.

The first support member 140 is structured as an elongated member having a generally U-shaped cross-sectional profile and defines a channel 142. The first support member 140 has a first longitudinal end and a second longitudinal end (e.g., a free end). The first end of the first support member 140 is pivotably connected to the upper end of the first leg 110 and/or the first leg member 112 via the first support pin 104. The second/free end of the first support member 140 is insertable into the internal space 162 of the second support member 160 and is releasably connectable to the second support member 160 by the lock mechanism 200 and/or the safety pin 108 form the cross member 190.

The first support member 140 includes a support pin recess 144, a safety pin recess 146, and a notch 148. The support pin recess 144 is disposed adjacent to the first end of the first support member 140 and receives the first support pin 104. The safety pin recess 146 is disposed adjacent to the second/free end of the first support member 140 and receives the safety pin 108. The notch 148 is configured to selectively receive a portion of the lock mechanism 200 (e.g., the second plate 204). The notch 148 is disposed adjacent to the second/free end of the first support member 140 and/or the safety pin recess 146. The notch 148 and the first mounting plate 170 are disposed on opposite sides of the first support member 140. The notch 148 is generally triangular and/or wedge shaped, and opens in the same direction as the channel 142 (e.g., generally vertically downward toward the ground and/or the feet 130, 132 when the support assembly 100 is disposed in the use position).

A portion of the upper end of the first leg 110 and/or the first leg member 112 is disposed within the channel 142 of the first support member 140 such that the support pin recess 116 of the first leg 110 is disposed in the channel 142 and aligned with the support pin recess 144 of the first support member 140. The first support pin 104 is disposed in and extends through the support pin recesses 116, 146 transversely (e.g., perpendicularly) to the first leg 110, the first leg member 112, and the first support member 140 thereby pivotably connecting the first leg 110 and the first support member 140.

The second support member 160 is structured as a hollow elongated member defining an internal space 162 into which the first support member 140 is insertable. The second support member 160 has a first longitudinal end and a second longitudinal end (e.g., a free/open end). The first end of the second support member 160 is pivotably connected to upper end of the second leg 120 and/or the second and third leg members 122a, 122b via the second support pin 106. The second/free end of the second support member 160 is open such that the first support member 140 is insertable into the internal space 162 through the second/free end. The second end of the second support member 160 is releasably connectable to the first support member 140 by the lock mechanism 200 and/or the safety pin 108 to form the cross member 190.

The second support member 160 includes a support pin recess 164, a safety pin recess 166, a shaft slot 168, and the lock mechanism 200. The support pin recess 164 is disposed adjacent to the first end of the second support member 160 and receives the second support pin 106. The safety pin recess 166 is disposed adjacent to the free/open end of the second support member 160 and receives the safety pin 108. The shaft slot 168 receives a portion of the lock mechanism 200 (e.g., the shaft 212) and is disposed adjacent to the free/open end of the second support member 160, the safety pin recess 166, and/or the lock mechanism 200.

The first end of the second support member 160 is disposed between and spaced apart from the upper ends of the second and third leg members 122a, 122b such that the support pin recesses 126a, 126b, 164 are aligned with one another. The second support pin 106 is disposed in and extends through the support pin recesses 126a, 126b, 164 transversely (e.g., perpendicularly) to the second leg 120, the second and third leg members 122a, 122b, and the second support member 160 thereby pivotably connecting the second leg 120 and the second support member 160.

The support assembly 100 and/or the first support member 140 includes a first mounting plate 170. The first mounting plate 170 is disposed on an upper surface of the first support member 140 adjacent to the first end of the first support member 140 and connected thereto via plate screws 172. The support pin recess 144 and/or the first support pin 104 are disposed between the first mounting plate 170 and the free end of the first support member 140 and/or the safety pin recess 146. The first mounting plate 170 includes a plurality of mounting openings 174 for connecting one or more different types of heat transfer printers and cutters and/or adapter plates to the support assembly 100. Optionally, the first mounting plate 170 may include a first plate projection 176 for connecting the feed assembly 230 to the support assembly 100. The first plate projection 176 projects transversely (e.g., perpendicularly) to the mounting plate 170 adjacent to the first end of the first support member 140.

The support assembly 100 and/or the second support member 160 includes a second mounting plate 180. The second mounting plate 180 is disposed on an upper surface of the second support member 160 adjacent to the first end of the first support member 140 and connected thereto via plate screws 182. The support pin recess 164 and/or the second support pin 106 are disposed between the second mounting plate 180 and the open end of the second support member 160 and/or the safety pin recess 166. The second mounting plate 180 includes a plurality of mounting openings 184 and, optionally, a second plate projection 186. The mounting openings 184 and the second plate projection 186 are structured and arranged like the mounting openings 174 and the first plate projection 176 and, for brevity, are not described in detail. By arranging the mounting plates 170, 180 on top of the support members 140, 160 and outside of the support pins 104, 106, the heat transfer printer and cutter 300 does not directly contact and/or rest on the support members 140, 160 and the weight of the heat transfer printer and cutter 300 is not applied directly onto the lock mechanism 200 and/or the safety pin 108, which may extend the operational life of the lock mechanism 200 and/or the safety pin 108.

Figure 7:
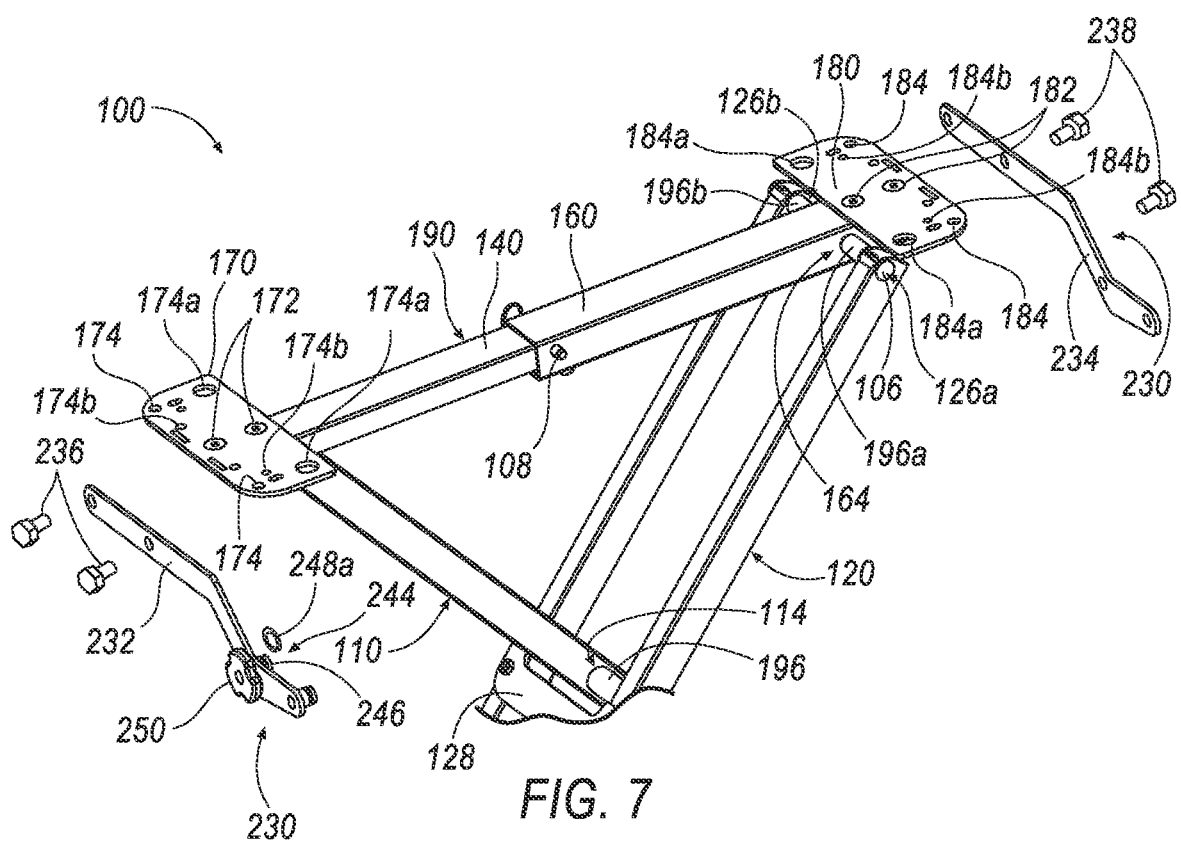
FIG. 7 is a perspective, partially exploded view of the support assembly of FIG. 6.
Figure 8A:
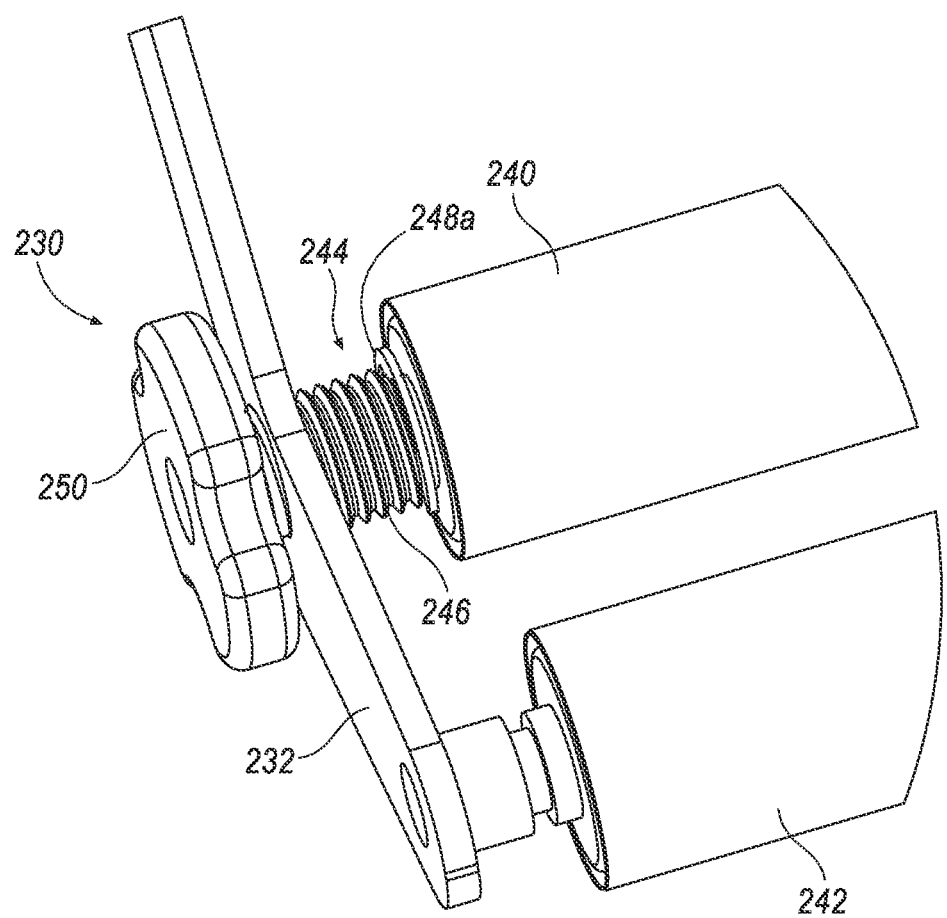
FIGS. 8A and 8B are close-up, perspective views of portions of the feed material assembly of the support assembly of FIG. 6.
Figure 8B:
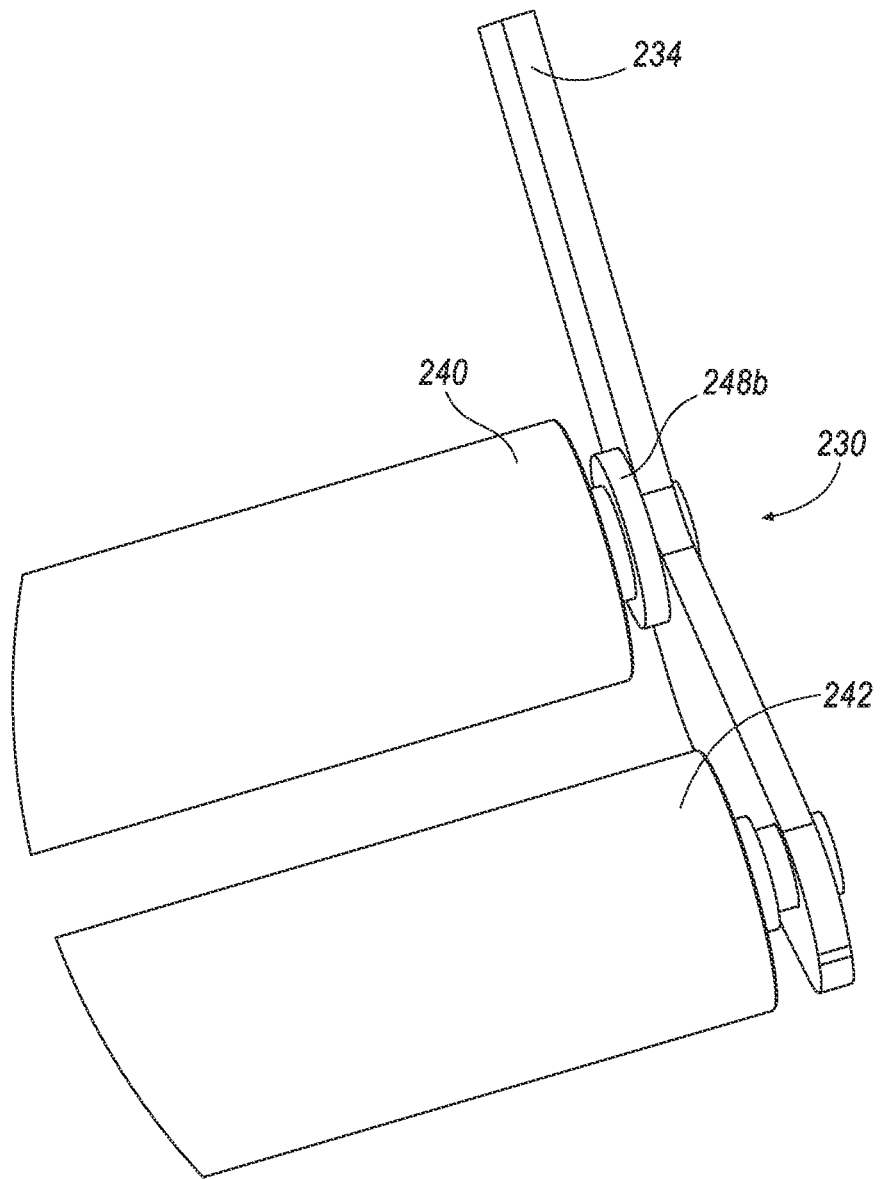

When the support assembly 100 is disposed in the use position, the mounting openings 174, 184 define a plurality of opening patterns that each correspond to a different mounting pattern commonly utilized to mount heat transfer printers and cutters as generally shown in FIGS. 1 and 7. For example, a first subset of the mounting openings 174a, 184a define a first opening pattern and, thus, enable any heat transfer printer and cutter (e.g., a first heat transfer printer and cutter) with the corresponding first mounting pattern to be mounted on the support assembly 100. A second subset of the mounting openings 174b, 184b define a second opening pattern and, thus, enable any heat transfer printer and cutter (e.g., a second heat transfer printer and cutter) with the corresponding second mounting pattern to be mounted on the support assembly 100. To mount a heat transfer printer and cutter with a mounting pattern that does not correspond to any of the opening patterns defined by the mounting openings 174, 184, one or more adapter plates with openings that define the corresponding opening pattern may be connected to the mounting plates 170, 180 via the mounting openings 174, 184. Additionally and/or alternatively, the mounting plates 170, 180 may be removed and replaced with different mounting plates with openings that define the corresponding opening pattern.

One or more spacers 196 is arranged on one or more of the pins 102, 104, 106. The spacers 196 may properly position the leg members 112, 122a. 122b and/or the support members 140, 160 on the associated pin 102, 104, 106 and/or may restrict the leg members 112, 122a, 122b and/or the support members 140, 160 from moving axially along the associated pin 102, 104, 106 (e.g., relative to one another). In this manner, the spacers 196 maintain alignment of the leg members 112, 122a, 122b and/or the support members 140, 160 relative to one another and, thus, make it easier for a user to adjust the support assembly 100 between the storage position and the use position. For example, as can be seen in FIG. 1, a first spacer 196a is arranged on the second support pin 106 between the second support member 160 and the second leg member 122a substantially filling the gap therebetween. A second spacer 196b is arranged on the second support pin 106 between the second support member 160 and the third leg member 122b substantially filling the gap therebetween. The spacers 196a, 196b properly align and position the second support member 160 relative to the leg members 122a, 122b and the first support member 140, which makes it easier to insert the first support member 140 into the second support member 162 when adjusting the support assembly 100 to the use position.

Figure 2:
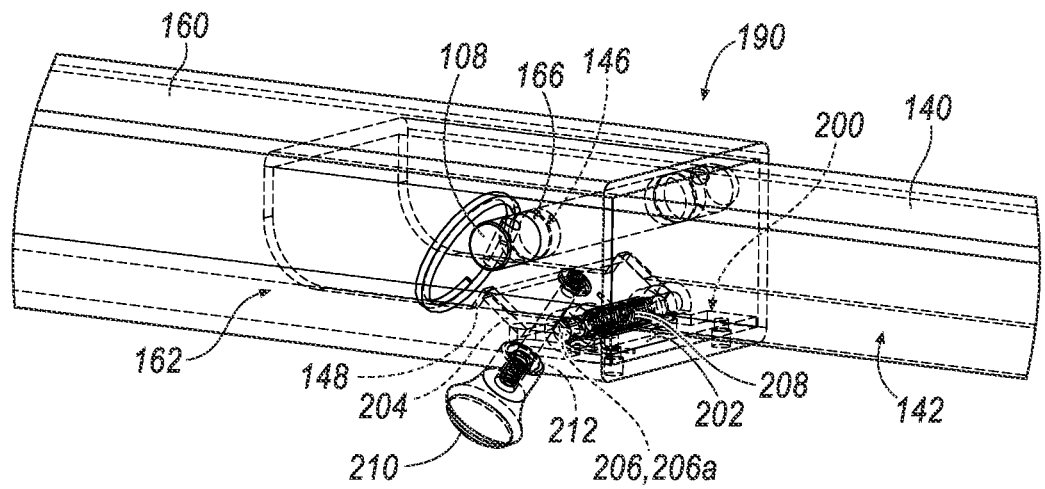
FIG. 2 is a close-up, perspective view of a cross member of the support assembly shown in FIG. 1, with the cross member shown in phantom to illustrate an exemplary lock mechanism.
Figure 3:
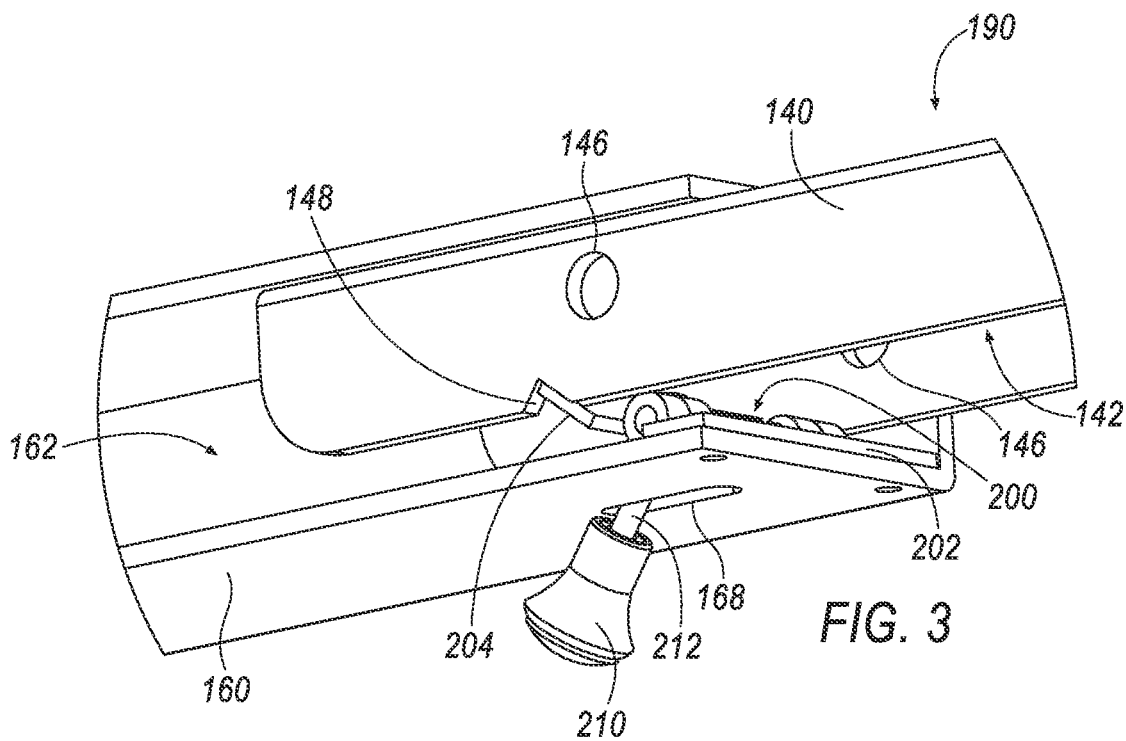
FIG. 3 is a partial cutaway perspective view of the cross member of the support assembly shown in FIG. 1.

Referring now to FIGS. 2 and 3, the second support member 160 includes the lock mechanism 200, which is structured as a spring-loaded hinge lock. The lock mechanism 200 is disposed partially within the internal space 162 at and/or adjacent to the free/open end of the second support member 160. The lock mechanism 200 includes a first plate 202, a second plate 204, a hinge pin 206, a hinge spring 208, a release knob 210, and a shaft 212. The first plate 202 is disposed on and connected (e.g., fixed) to the second support member 160. The second plate 204 is pivotably connected to the first plate 202 via the hinge pin 206 and selectively engages the notch 148 to releasably connect the first and second support members 140, 160. The hinge pin 206 extends substantially parallel to the pins 102, 104, 106, 108 and defines a fourth pivot axis 206a. The hinge spring 208 biases the second plate 204 toward the first plate 202 and/or away from the shaft slot 168. The release knob 210 is disposed outside of the internal space 162 and is connected to the second plate 204 via the shaft 212. The shaft 212 is disposed in and extends through the shaft slot 168 of the second support member 160 such that the shaft 212 is adjustable and/or movable within the shaft slot 168. The shaft 212 is thus disposed partially inside and partially outside the internal space 162. The second plate 204, the release knob 210, and the shaft 212 rotate about the hinge pin 206 in conjunction with one another. As such, a user may actuate, move, and/or adjust the release knob 212 to change, move, and/or adjust the position of the second plate 204 relative to the first support plate 202 (e.g., to disengage the second plate 204 from the notch 148). When the second plate 204 is engaged with the notch 148, the support members 140, 160 are connected to form the cross member 190 and the safety pin recesses 146, 166 are aligned with one another such that the safety pin 108 is insertable into the safety pin recesses 146, 166. When the safety pin 108 is disposed in the safety pin recesses 146, 166 the support members 140, 160 are restricted and/or prevented from disconnecting (e.g., in the event that the lock mechanism 200 becomes disengaged from the notch 148).

Figure 4A:
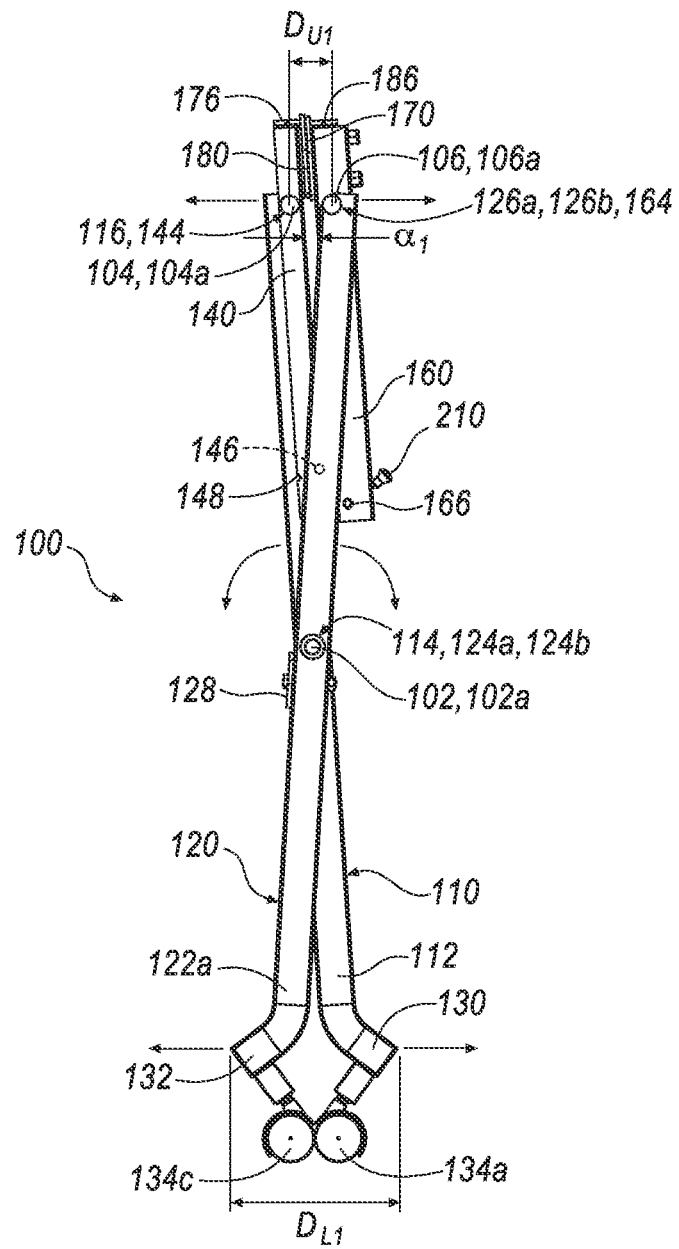
FIGS. 4A through 4E illustrate an exemplary method of adjusting the support assembly of FIG. 1 from a storage position to a use position.

Referring now to FIG. 4A, the support assembly 100 disposed in the storage position, in which the support assembly 100 is more compact enabling it to be easily moved (e.g., around a shop floor) and stored. When the support assembly 100 is disposed in the storage position, the legs 110, 120 are disposed in a first/folded position and the support members 140, 160 are not connected to one another via the lock mechanism 200 and are disposed in a first/collapsed position. When the legs 110, 120 are disposed in the folded position (see FIG. 4A), a first angle $\alpha_1$ is defined between the first leg 110 and the second leg 120, the support pins 104, 106 are disposed spaced apart from one another by a first upper distance $D_{U1}$, the feet 130, 132 are disposed spaced apart from one another by a first lower distance $D_{L1}$, and the mounting plates 170, 180 extend substantially vertical and contact one another. When the support members 140, 160 are disposed in the collapsed position (see FIGS. 4A and 4B), the first support member 140 extends substantially parallel to the first leg 110 and/or the first leg member 112 and the second support member 160 extends substantially parallel to the second leg 120 and/or the leg members 122a, 122b. The second/free end of the first support member 140 is arranged on the first leg 110 and/or the first leg member 112 such that the first leg member 112 is partially disposed within the channel 144 and extends substantially parallel to the first support member 140 therein. In other words, the first leg member 112 is at least partially nested within the first support member 140. The free/open end of the second support member 160, the safety pin recess 166, and/or the lock mechanism 200 are disposed at least partially between the second and third leg members 122a, 122b of the second leg 120.

Referring now to FIGS. 1-3, 4D, 4E, 5C, 6, and 7, the support assembly 100 disposed in the use position, in which a heat transfer printer and cutter 300 is connectable to the support assembly 100 and the support assembly 100 is able to support the weight of the heat transfer printer and cutter 300 and the feed material 302 in a secure and stable manner. When the support assembly 100 is disposed in the use position, the first leg 110 and/or the first leg member 112 are disposed spaced apart from (i.e., does not directly contact) the stop 128 and the support members 140, 160 are disposed in an engaged position in which the support members 140, 160 are connected to one another via the lock mechanism 200 to form the cross member 190. A third angle $\alpha_3$ is defined between the legs 110, 120, the support pins 104, 106 are disposed spaced apart from one another by a third upper distance $D_{U3}$, and the feet 130, 132 are disposed spaced apart from one another by a third lower distance $D_{L3}$. The support members 140, 160 are disposed substantially parallel to one another and/or to the ground/floor. The first support member 140 extends obliquely relative to the first leg 110 and/or the first leg member 112. The second support member 160 extends obliquely relative to the second leg 120 and/or the second and third leg members 122a, 122b. The first support member 140 projects into the internal space 162 of the second support member 160 through the free/open end of the second support member 160 and is disposed at least partially in the second support member 160. The second plate 204 is disposed partially in the notch 148 and contacts the first support member 140 (i.e., the lock mechanism 200 is engaged with the first support member 140) connecting the support members 140, 160. The safety pin recesses 146, 166 are aligned with one another such that the safety pin 108 is insertable into the safety pin recesses 146, 166. The mounting plates 170, 180 extend substantially parallel to one another and are disposed spaced apart from one another in a common horizontal plane such that the mounting openings 174, 184 define the plurality of opening patterns.

FIGS. 4A-4E illustrate an exemplary method of adjusting the support assembly 100 from the storage position (see FIG. 4A) to the use position (see FIGS. 1-3, 4D, 4E, 5C, 6, and 7) and locking the support assembly 100 in the use position with the safety pin 108. The support assembly 100 is adjustable to the storage position and to the use position by rotating the first leg 110 and the second leg 120 relative to one another about the leg pin 102, rotating the first support member 140 relative to the first leg 110 about the first support pin 104, and rotating the second support member 160 relative to the second leg 120 about the second support pin 106.

Figure 4B:
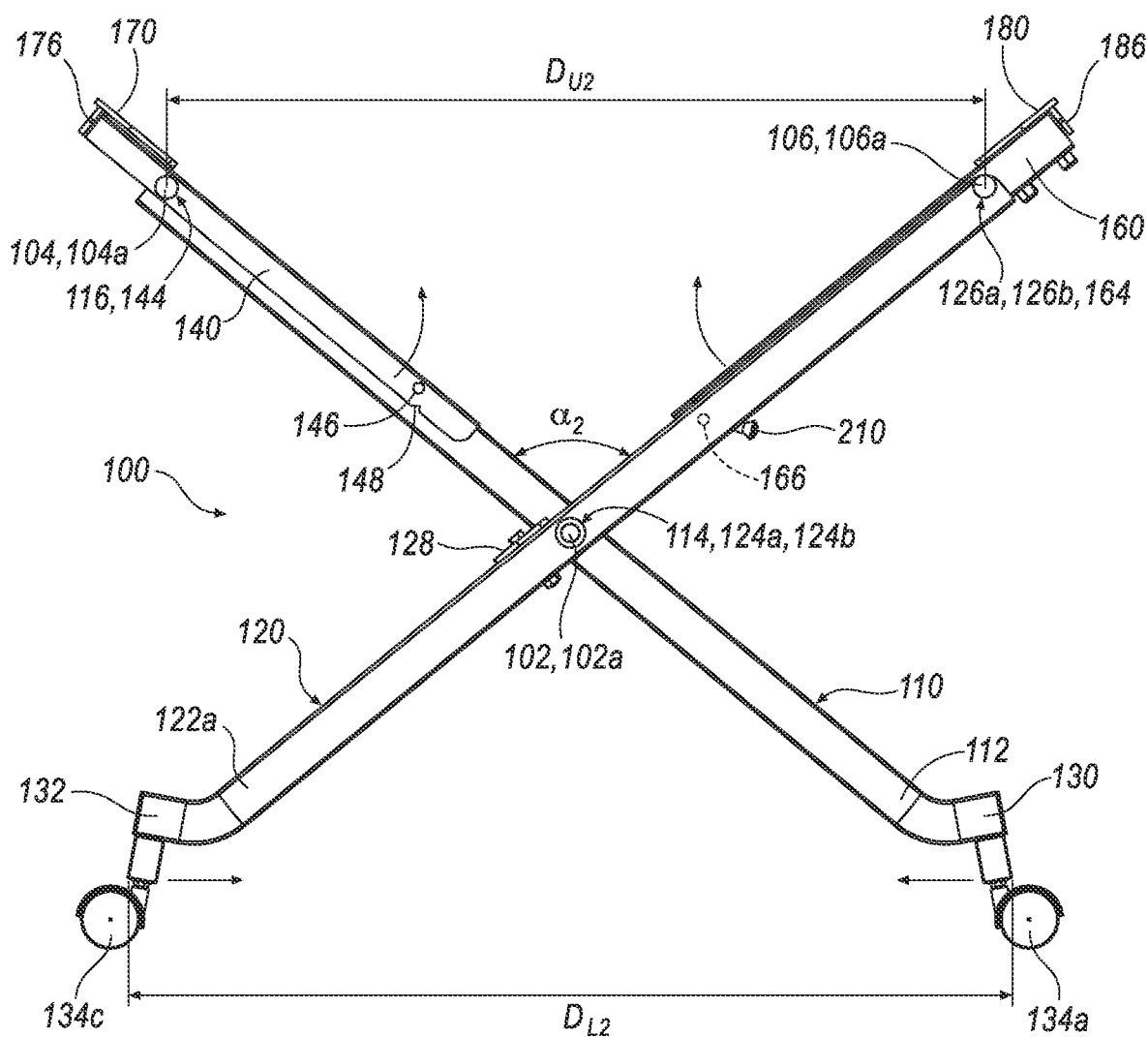

As generally illustrated by the movement arrows in in FIG. 4A, the method includes adjusting the legs 110, 120 from the folded position shown in FIG. 4A to a stopped position shown in FIG. 4B via rotating the legs 110, 120 away from one another about the leg pin 102 until the first leg 110 and/or the first leg member 112 contacts the stop 128 and further rotation of the legs 110, 120 is prevented. The rotation of the legs 110, 120 to the stopped position (i) increases an angle defined between the legs 110, 120 from the first angle $\alpha_1$ to a second angle $\alpha_2$. (ii) moves the upper end of the first leg 110 (as well as the first support pin 104, the first mounting plate 170, etc.) and the upper end of the second leg 120 (as well as the second support pin 106, the second mounting plate 180, etc.) away from one another increasing a distance between the support pins 104, 106 from the first upper distance $D_{U1}$ to a second upper distance $D_{U2}$, and (iii) moves the lower end of the first leg 110 (as well as the first foot 130) and the lower end of the second leg 120 (as well as the second foot 132) away from one another increasing a distance between the feet 130, 132 from the first lower distance $D_{L1}$ to a second lower distance $D_{L2}$. When the legs 110, 120 are in the stopped position, the support members 140, 160 are rotatable about the support pins 104, 106 without coming into contact with one another. This enables the support members 140, 160 to each be adjusted to one or more desired positions and prevents the support members 140, 160 from blocking one another from being adjusted (e.g., to the insertion position). Additionally, since further rotation of the legs 110, 120 is prevented, the legs 110, 120 are maintained in the stopped position by the stop 128 and the support assembly 100 is able to stand freely on its own. This enables the user adjusting the support assembly 100 to release the legs 110, 120 and use both hands during one or more subsequent steps (e.g., when rotating the support members 140, 160 about the support pins 104, 106), which may make these steps significantly easier to perform. Adjusting the legs 110, 120 to the stopped position is not required, however. For example, the legs 110, 120 may be rotated about the leg pin 102 to a position just short of and/or close to the stopped position in which there is sufficient clearance between the support pins 104, 106 to adjust the support members 140, 160 from the collapsed position to the insertion position as described below.

Figure 4C:
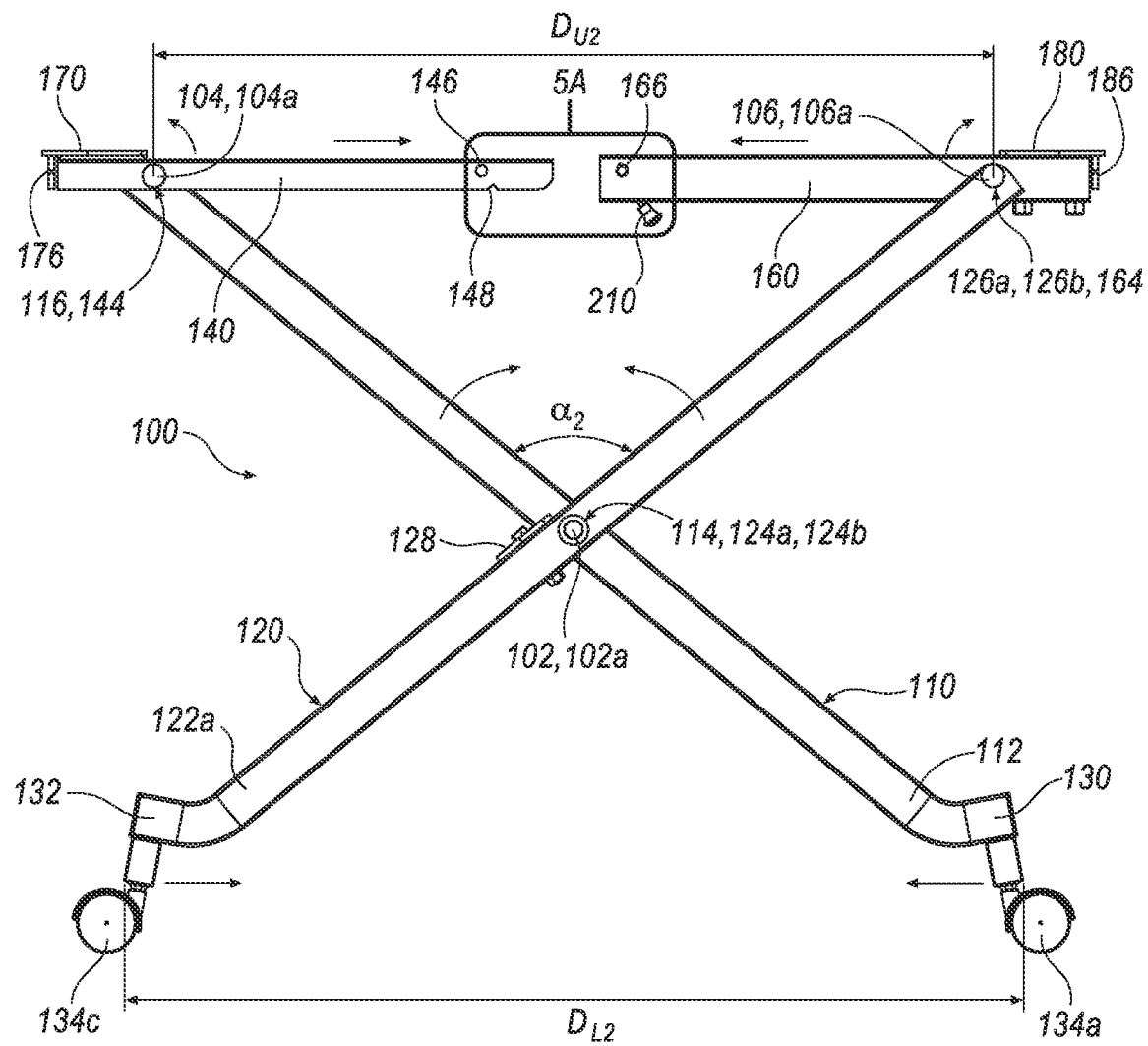

As generally illustrated by the movement arrows in in FIG. 4B, the method includes adjusting the support members 140, 160 from the collapsed position shown in FIG. 4B to an insertion position shown in FIG. 4C when the legs 110, 120 are in the stopped position. Adjusting the support members 140, 160 to the insertion position includes rotating the first support member 140 about the first support pin 104 away from the first leg 110 and rotating the second support member 160 about the second support pin 106 away from the second leg 120 until the support members 140, 160 are substantially aligned with one another to facilitate insertion of the first support member 140 into the internal space 162 of the second support member 160. When the support members 140, 160 are substantially aligned with one another (i.e., are in the insertion position), the free end of the first support member 140 is disposed spaced apart from and faces the free/open end of the second support member 160. Additionally, the support members 140, 160 are disposed substantially parallel to one another and/or to the ground.

The support members 140, 160 may also be adjusted from the collapsed position to the insertion position when the legs 110, 120 are not disposed in the stopped position. For example, the support member 140, 160 may be adjusted from the collapsed position to the insertion position in any position of the legs 110, 120 where there is sufficient clearance between the support pins 104, 106 to do so. This may be more challenging, however, because a user would have to hold the legs 110, 120 to maintain their position (e.g., prevent them from rotating about the leg pin 102) while simultaneously adjusting the support member 140, 160 to the insertion position.

Figure 4D:
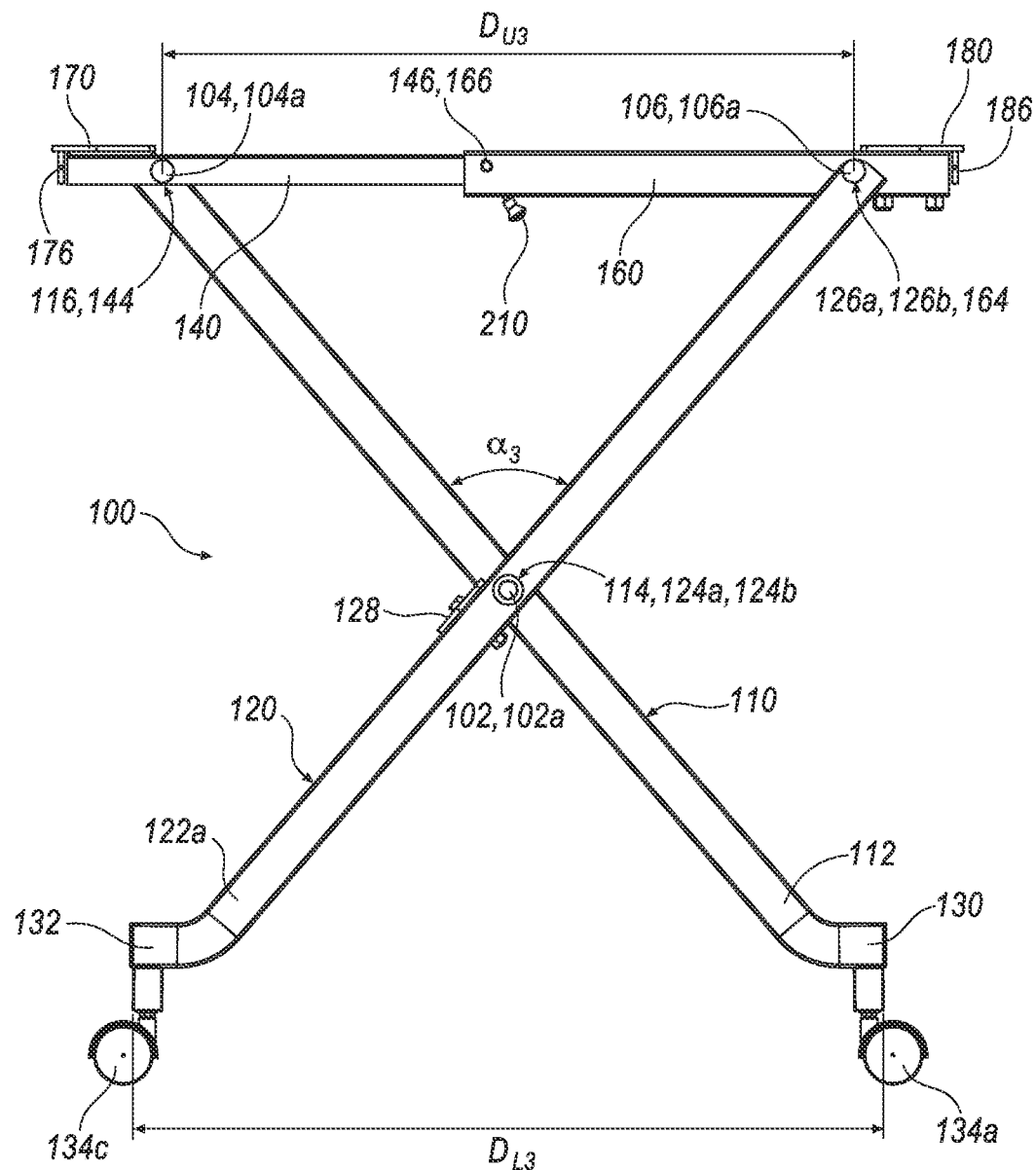
Figure 4E:
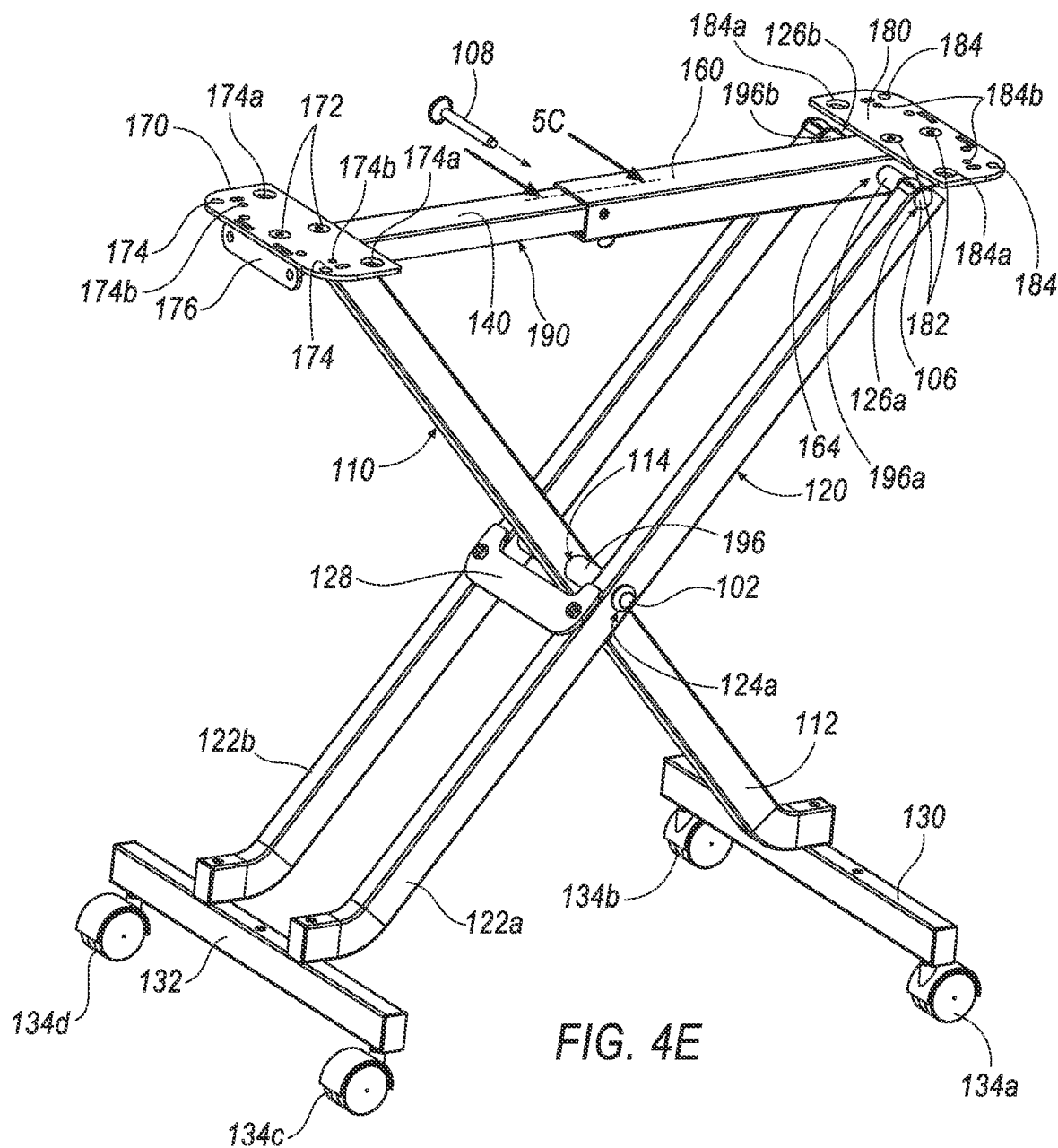
Figure 5A:
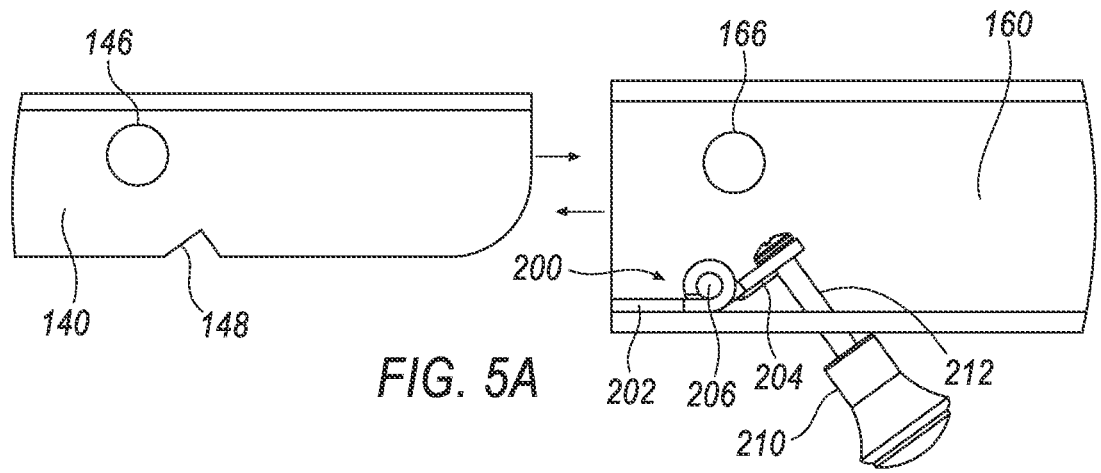
FIGS. 5A through 5C illustrate an exemplary method of connecting a first and second support member of the support assembly of FIG. 1.
Figure 5B:
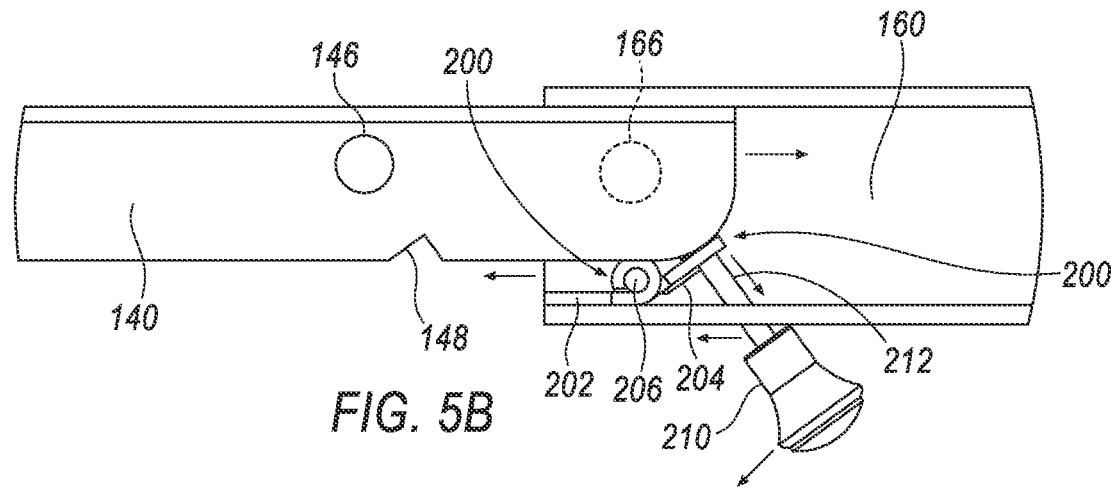
Figure 5C:
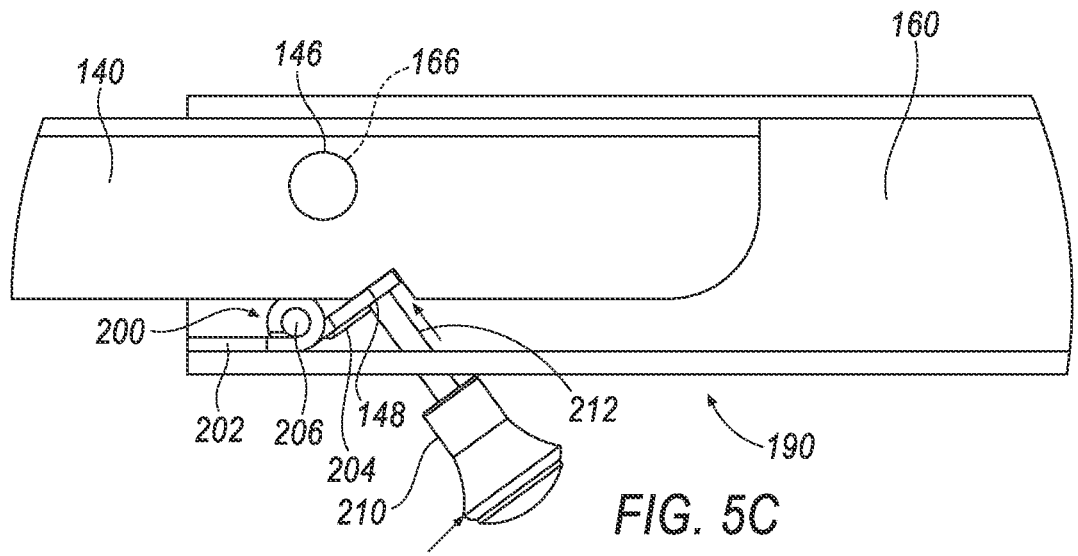

As generally illustrated by the movement arrows in in FIG. 4C, the method includes adjusting the support members 140, 160 from the insertion position shown in FIG. 4C to an engaged position shown in FIGS. 4D and 4E to connect the support members 140, 160, form the cross member 190, and place the support assembly 100 in the use position. To adjust the support members 140, 160 to the engaged position, the legs 110, 120 are rotated toward one another about the leg pin 102 to move the upper end of the first leg 110 (as well as the first support pin 104, the first support member 140, etc.) and the upper end of the second leg 120 (as well as the second support pin 106, the second support member 160, etc.) toward one another. While rotating the legs 110, 120 about the leg pin 102, the first support member 140 is rotated away from the first leg 110 about the first support pin 104 and the second support member 160 is rotated away from the second leg 120 about the second support pin 106 to maintain alignment of the support members 140, 160 and facilitate insertion of the first support member 140 into the internal space 162 of the second support member 160. By rotating the legs 110, 120 while simultaneously rotating the support members 140, 160, the free end of the first support member 140 is inserted into the internal space 162 through the free/open end of the second support member 160, and the notch 148 and the lock mechanism 200 are moved toward one another until the lock mechanism 200 (e.g., the second locking plate 204) engages the notch 148 and prevents further rotation of the legs 110, 120 about the leg pin 102. Engaging the lock mechanism 200 and the notch 148, the process of which is illustrated in FIGS. 5A-5C and described in detail below, releasably connects the support members 140, 160 to form the cross member 190. The rotation of the legs 110, 120 also (i) reduces the angle defined between the legs 110, 120 from the second angle $\alpha_2$ to the third angle $\alpha_3$, which is greater than the first angle $\alpha_1$, (ii) decreases the distance between the support pins 104, 106 from the second upper distance Due to a third upper distance $D_{U3}$, which is greater than the first upper distance $D_{U1}$, and (iii) decreases the distance between the feet 130, 132 from the second lower distance $D_{L2}$ to the third lower distance $D_{L3}$, which is greater than the first lower distance $D_{L1}$.

As generally illustrated by the movement arrows in FIG. 4E, the method includes selectively locking the support assembly 100 in the use position via engaging the safety pin 108 and the cross member 190. Engaging the safety pin 108 and the cross member 190 includes inserting the safety pin 108 into the safety pin recesses 146, 166.

FIGS. 5A-5C show cross-sectional views through the lock mechanism 200 illustrating the process of engaging the lock mechanism 200 and the notch 148 when adjusting the support members 140, 160 from the insertion position shown in FIG. 4C to the engaged position shown in FIGS. 4D and 4E. As explained above, the legs 110, 120 and support members 140, 160 are rotated to move the first support member 140 and the second support member 160 toward one another while maintaining their relative alignment as illustrated in FIG. 5A. The free end of the first support member 140 is inserted into the internal space 162 through the free/open end of the second support member 160. As illustrated in FIG. 5B, a curved contact/pressing surface of the first support member 140 contacts and pushes the second support plate 204 causing the second plate 204, the release knob 210, and the shaft 212 to rotate about the hinge pin 206 away from the first plate 202 (e.g., toward the shaft slot 168) and against the spring force of the hinge spring 208 to a compressed position. During this rotation, the shaft 212 is moved through the shaft slot 168 toward the free/open end of the second support member 160. The movement of the support members 140, 160 continues and the second plate 204 slides along a lower/bottom surface of the first support member 140, which holds the second plate 204 in the compressed position. As generally illustrated in FIG. 5C, once the notch 148 and the second plate 204 become aligned with one another, the second plate 204 is no longer held in the compressed position and snaps into engagement with the notch 148 via the hinge spring 208 rotating the second plate 204, the release knob 210, and the shaft 212 about the hinge pin 206. During this rotation, the shaft 212 is moved through the shaft slot 168 away from the free/open end of the second support member 160.

An exemplary method of adjusting the support assembly 100 from the use position to the storage position includes disengaging the safety pin 108 from the cross member 190 and disengaging the lock mechanism 200 from the first support member 140. Disengaging the safety pin 108 from the cross member 190 includes removing the safety pin 108 from the safety pin recesses 146, 166. Disengaging the lock mechanism 200 from the first support member 140 includes actuating, adjusting, and/or moving the release knob 210 generally toward the free/open end of the second support member 160 to rotate the second plate 204 about the hinge pin 206 and remove the second plate 204 from the notch 148. While the safety pin 108 and the lock mechanism 200 are disengaged, the support members 140, 160 are moved away from one another to remove the first support member 140 from the internal space 162 of the second support member 160 via rotating the legs 110, 120 away from one another about the leg pin 120 (e.g., to the stopped position). The support members 140, 160 are then adjusted to the collapsed position via rotating each of the support members 140, 160 about the associated support pin 104, 106 toward the associated leg 110, 120. The legs 110, 120 are then adjusted (e.g., from the stopped position) to the folded position shown in FIG. 4A via rotating the legs 110, 120 toward one another about the leg pin 102. One or more of these steps may include performing one or more of the actions described with respect to the method of adjusting the support assembly 100 from the storage position to the use position in the opposite direction and/or in reverse order.

Optionally, the support assembly 100 may include a feed assembly 230 to hold and/or support the feed material 302 for the heat transfer printer and cutter 300 as illustrated in FIGS. 6-8B. The feed assembly 230 includes a first arm 232, a second arm 234, an adjustable roller 240, and a passive roller 242. The first arm 232 is connected to the first plate projection 176 via first arm screws 236. The second arm 234 is connected to the second plate projection 186 via second arm screws 238. The arms 232, 234 generally extend transversely (e.g., perpendicularly) to the legs 110, 120 and the support members 140, 160. The rollers 240, 242 extend between the arms 232, 234 and are substantially parallel to the cross member 190. The rollers 240, 242 are rotatably connected to the arms 232, 234 and, thus, are rotatable relative to the arms 232, 234. The speed at which the adjustable roller 240 may rotate and/or an amount of force needed to rotate the adjustable roller 240 is adjustable via a roller brake 244. The passive roller 242 is freely rotatable and, thus, the speed at which the passive roller 242 may rotate and/or an amount of force needed to rotate the passive roller 242 is not adjustable. The roller brake 244 includes a threaded shaft 246 and a plurality of friction gaskets 248a, 248b configured to apply resistance to the adjustable roller 240 to restrict and/or limit rotation of the adjustable roller 240. The threaded shaft 246 is connected to the first arm 232 and/or the adjustable roller 240. An adjustment knob 250 is connected to the threaded shaft 246. A user can actuate, turn, and/or twist the adjustment knob 250 to adjust the amount of resistance applied to the adjustable roller 240 by the roller brake 244 to make the adjustable roller 240 easier to rotate (e.g., rotatable with lesser force) or harder to rotate (e.g., rotatable with greater force).

The exemplary illustrations are not limited to the previously described examples. Rather, a plurality of variants and modifications are possible, which also make use of the ideas of the exemplary illustrations and therefore fall within the protective scope. Accordingly, it is to be understood that the above description is intended to be illustrative and not restrictive.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "the," etc. should be read to recite one or more of the indicated elements unless a claim recites an explicit limitation to the contrary.

The invention claimed is:

1. A support assembly for a heat transfer printer and cutter, comprising:
   a first leg;
   a second leg pivotably connected to the first leg;
   a first support member pivotably connected to the first leg;
   a second support member pivotably connected to the second leg;
   a first support pin pivotably connecting the first leg and the first support member; and
   a second support pin pivotably connecting the second leg and the second support member;
   wherein the first support member and the second support member are releasably connectable;
   wherein the support assembly is adjustable to a use position and to a storage position via rotating the first leg and the second leg relative to one another, rotating the first support member relative to the first leg, and rotating the second support member relative to the second leg;
   wherein, when the support assembly is disposed in the use position:
      the first support member and the second support member are releasably connected to one another;
      a first angle is defined between the first leg and the second leg; and
      a first upper distance is defined between the first support pin and the second support pin; and
   wherein, when the support assembly is disposed in the storage position:
      the first support member and the second support member are disconnected from one another;
      a second angle, which is smaller than the first angle, is defined between the first leg and the second leg; and
      a second upper distance, which is smaller than the first upper distance, is defined between the first support pin and the second support pin.

2. The support assembly of claim 1, further comprising at least one of a lock mechanism and a safety pin via which the first support member and the second support member are releasably connectable.

3. The support assembly of claim 1, further comprising a safety pin via which the first support member and the second support member are releasably connectable, wherein:
   the first support member includes a first safety pin recess;
   the second support member includes a second safety pin recess; and
   the safety pin is disposed in the first safety pin recess and the second safety pin recess and connects the first support member and the second support member when the support assembly is disposed in the use position.

4. The support assembly of claim 1, further comprising a lock mechanism via which the first support member and the second support member are releasably connectable, wherein the lock mechanism includes:
   a first plate fixed to the second support member;
   a second plate pivotably connected to the first plate; and
   a hinge spring biasing the second plate toward the first plate.

5. The support assembly of claim 4, wherein:
   the lock mechanism further includes a release knob via which a user may disengage the lock mechanism to disconnect the first support member and the second support member;
   the release knob is connected to the second plate; and
   the second plate is rotatable relative to the first support plate via actuation of the release knob.

6. The support assembly of claim 4, wherein the first support member includes a notch that is selectively engaged by the second plate of the locking mechanism to connect the first support member and the second support member.

7. The support assembly of claim 1, further comprising a lock mechanism via which the first support member and the second support member are releasably connectable, wherein:
   the second support member defines an internal space into which the first support member is insertable; and
   the lock mechanism is disposed at least partially in the internal space and fixed to the second support member.

8. The support assembly of claim 7, wherein:
   the lock mechanism includes:

a release knob via which a user may disengage the lock mechanism to disconnect the first support member and the second support member; and a shaft connected to the release knob;

the second support member includes a shaft slot; and the release knob is disposed outside of the internal space of the second member and the shaft extends through the shaft slot.

9. The support assembly of claim 1, wherein:

the second leg includes a stop configured to restrict rotation of the first leg and the second leg relative to one another;

the first leg and the second leg are adjustable to a stopped position; and when in the stopped position, the first leg is disposed on and contacts the stop preventing further rotation of the first leg and the second leg relative to one another.

10. The support assembly of claim 9, further comprising a leg pin pivotably connecting the first leg and the second leg, wherein:

the first leg includes a first leg member;

the second leg further includes a second leg member and a third leg member;

the stop extends between and connects the second leg member and the third leg member;

the first leg member and the second support member are disposed between the second leg member and the third leg member; and when in the stopped position, the first leg member is disposed on and contacts the stop preventing further rotation of the first leg and the second leg relative to one another.

11. The support assembly of claim 1, wherein:

the first support member has a U-shaped cross-sectional profile and defines a channel;

the first leg includes a first leg member;

the first leg member is disposed partially in the channel of the first support member and extends obliquely relative to the first support member when the support assembly is disposed in the use position; and the first leg member is disposed in the channel of the first support member and extends substantially parallel to the first support member when the support assembly is disposed in the storage position.

12. The support assembly of claim 1, wherein:

the second leg includes two leg members;

the second support member has an open end through which the first support member is insertable;

the second support member is disposed at least partially between the two leg members and extends obliquely relative to the two leg members when the support assembly is disposed in the use position; and the open end of the second support member is disposed at least partially between the two leg members when the support assembly is disposed in the storage position.

13. The support assembly of claim 1, wherein:

the second support member defines an internal space and has an open end; and the first support member projects into the internal space via the open end of the second support member and is partially disposed in the second support member when the support assembly is disposed in the use position.

14. The support assembly of claim 1, further comprising:

a first mounting plate including a plurality of first mounting openings;

a second mounting plate including a plurality of second mounting openings;

a first subset of the plurality of first mounting openings and the plurality of second mounting openings define a first opening pattern corresponding to a first mounting pattern of a first heat transfer printer and cutter; and a second subset of the plurality of first mounting openings and the plurality of second mounting openings define a second opening pattern corresponding to a second mounting pattern of a second heat transfer printer and cutter.

15. The support assembly of claim 14, wherein:

the first mounting plate and the second mounting plate contact one another when the support assembly is disposed in the storage position; and the first mounting plate and the second mounting plate are disposed spaced apart from one another in a common horizontal plane when the support assembly is disposed in the use position.

16. A support assembly for a heat transfer printer and cutter, comprising:

a first leg;

a second leg including a stop;

a leg pin pivotably connecting the first leg and the second leg;

a first support member;

a second support member;

a first support pin pivotably connecting the first leg and the first support member;

a second support pin pivotably connecting the second leg and the second support member;

a first mounting plate disposed on the first support member; and a second mounting plate disposed on the second support member;

wherein the support assembly is adjustable to a storage position and to a use position; and wherein the support assembly is adjustable from the storage position to the use position via sequentially (i) rotating the first leg and the second leg away from one another about the leg pin until the first leg is disposed on the stop, (ii) rotating the first support member away from the first leg about the first support pin and rotating the second support member away from the second leg about the second support pin, (iii) rotating the first leg and the second leg toward one another about the leg pin, and (iv) releasably connecting the first support member and the second support member.

17. The support assembly of claim 16, wherein:

the first leg includes a first leg member;

the second leg further includes a second leg member and a third leg member between which the first leg member is disposed;

the stop extends between and connects the second leg member and the third leg member; and the second support member defines an internal space and has an open end.

18. The support assembly of claim 17, wherein:

when the support assembly is in the storage position, (i) the first leg member is nested within the first support member, (ii) the open end of the second support member is disposed between the second leg member and the third leg member, and (iii) the first mounting plate and the second mounting plate contact one another; and when the support assembly is in the use position, (i) the second support member extends obliquely relative to the second leg member and the third leg member, (ii) the first support member extends obliquely relative to the first leg member and projects into the internal space of the second support member through the open end of the second support member, (iii) the first support member and the second support member are releasably connected to one another; and (iv) the first mounting plate and the second mounting plate are disposed spaced apart from one another in a common horizontal plane.

* * * * *